US008420579B2

(12) United States Patent
Murase et al.

(10) Patent No.: US 8,420,579 B2
(45) Date of Patent: Apr. 16, 2013

(54) SLIDE MEMBER AND PROCESS FOR PRODUCING SLIDE MEMBER

(75) Inventors: Hitotoshi Murase, Kariya (JP); Toshihisa Shimo, Kariya (JP); Makoto Kato, Chita (JP); Kenzo Fukumori, Nisshin (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 595 days.

(21) Appl. No.: 11/666,598

(22) PCT Filed: Oct. 27, 2005

(86) PCT No.: PCT/JP2005/020172

§ 371 (c)(1), (2), (4) Date: Oct. 12, 2007

(87) PCT Pub. No.: WO2006/046773

PCT Pub. Date: May 4, 2006

(65) Prior Publication Data

US 2008/0194437 A1 Aug. 14, 2008

(30) Foreign Application Priority Data

Oct. 27, 2004 (JP) ................................ 2004-312903

(51) Int. Cl.
*F16C 33/20* (2006.01)
*B05D 3/02* (2006.01)

(52) U.S. Cl.
USPC .......................................... 508/108; 427/387

(58) Field of Classification Search ............... 428/474.4; 92/12.2; 524/446; 508/108; 427/387
See application file for complete search history.

(56) References Cited

U.S. PATENT DOCUMENTS

| | | | | |
|---|---|---|---|---|
| 4,898,905 | A | 2/1990 | Kawakami et al. | |
| 5,789,523 | A | 8/1998 | George et al. | |
| 7,138,453 | B1 * | 11/2006 | Suzuki et al. | 524/446 |
| 2003/0024380 | A1 * | 2/2003 | Shimo et al. | 92/12.2 |
| 2003/0091842 | A1 * | 5/2003 | Murakami et al. | 428/473.5 |
| 2004/0224856 | A1 * | 11/2004 | Saiki et al. | 508/108 |

FOREIGN PATENT DOCUMENTS

EP 1 253 318 A2 10/2002

(Continued)

OTHER PUBLICATIONS

Machine translation of JP 2001-302914, published Oct. 31, 2001.*
International Search Report for corresponding International PCT application No. PCT/JP2005/020172, published as WO 2006/046773 A1 on May 4, 2006.

(Continued)

*Primary Examiner* — James Goloboy
*Assistant Examiner* — Chantel Graham
(74) *Attorney, Agent, or Firm* — Locke Lord LLP

(57) ABSTRACT

A slide member having a substrate and a sliding layer formed on at least a sliding surface side of the substrate. The sliding layer comprises a resin composition comprising a polyamide-imide resin and an organically modified layered clay mineral dispersed uniformly in the polyamide-imide resin, and a solid lubricant held by the resin composition. The resin composition has an average linear expansion coefficient of between 3.12 and 5×10-5/° C. in the range from 100 to 200 ° C. The process for producing a slide member comprises coating at least the sliding surface side of a mixture of a resin solution comprising a polyamide-imide resin and a solvent for dissolving the polyamide-imide resin, solid lubricant powder, and an organically modified layered clay mineral; and subsequently removing the solvent of the coating composition.

16 Claims, 4 Drawing Sheets

STRENGTH [arbitrary unit]
FILM a
FILM g
0 5 10 15 20
2θ [° ]

FOREIGN PATENT DOCUMENTS

| | | | |
|---|---|---|---|
| JP | 01-261514 | | 10/1989 |
| JP | 02-178395 | | 7/1990 |
| JP | 04-088209 | | 3/1992 |
| JP | 04-089892 | | 3/1992 |
| JP | 07-166182 | | 6/1995 |
| JP | 11-013638 | | 1/1999 |
| JP | 11-092677 | A | 4/1999 |
| JP | 2001-302914 | | 10/2001 |
| JP | 2004-315618 | A | 11/2004 |

OTHER PUBLICATIONS

English translation of the International Preliminary Report on Patentability dated Aug. 23, 2007, Application No. PCT/JP2005/020172.

European Search Report dated Nov. 24, 2008 issued by European Patent Office for application No. 05799892.4-2104/1813663 PCT/JP2005020172.

* cited by examiner

SLIDE MEMBER AND PROCESS FOR PRODUCING SLIDE MEMBER

This application claims the benefit of PCT/JP2005/020172 filed Oct. 27, 2005 and Japanese patent application 2004-312903 filed Oct. 27, 2004.

TECHNICAL FIELD

This invention relates to a slide member used in sliding parts of a variety of devices and a process for producing the same.

BACKGROUND ART

Polyamide-imide resin is a resin material which is superior in heat resistance and mechanical strength and has a self-lubricating property. Therefore, polyamide-imide resin is often used in slide members of a variety of devices.

Each slide member has a substrate, and a sliding layer comprising a solid lubricant and a polyamide-imide resin which serves as a binder for holding the solid lubricant, as disclosed in Japanese Unexamined Patent Publication No. 11-13638, for instance. Generally, such a sliding layer can be obtained by coating a sliding surface side of the substrate with a coating composition in which a solid lubricant is mixed with a resin varnish.

Besides, some slide members are produced by injection molding a molding material in which a polyphenylene sulfide resin or a polyarylene sulfide resin is mixed with a polyamide-imide resin. For example, Japanese Unexamined Patent Publication No. 2001-302914 mentions a sliding ring formed of a resin composition in which a molding material comprising a polyamide-imide resin and a polyarylene sulfide resin is made to contain an organoclay composite prepared by modifying a swellable layered silicate with organic cations. However, since injection molding is to pour a material melted by heating into a mold and mold the material, injection molding has no degree of shape freedom, cannot produce sliding component parts which need to have a thin sliding layer, and has a difficulty in ensuring adhesiveness to other component parts. Besides, when the abovementioned blended polymers are molded by injection, since the polyamide-imide resin as a matrix and polymers blended into the matrix are different from each other, resultant moldings deteriorate in both mechanical characteristics and heat resistance due to the influence of the blended polymers.

Moreover, in recent years, there has been a demand for a further improvement in characteristics of slide members so as to ensure more reliability than ever.

DISCLOSURE OF INVENTION

The present invention has been conceived in view of the above circumstances, and it is an object of the present invention to provide a novel slide member having superior characteristics to the conventional and a process for producing the same.

The present inventors have earnestly studied and made trials and errors repeatedly and as a result have found that characteristics of a slide member can be further improved by employing, as a sliding layer, a resin composition in which an organically modified layered clay mineral is uniformly dispersed in a polyamide-imide resin.

Namely, a slide member of the present invention is characterized by having a substrate; and a sliding layer formed on at least a sliding surface side of the substrate and comprising a resin composition comprising a polyamide-imide resin having a number average molecular weight of 10,000 to 35,000 and an organically modified layered clay mineral dispersed uniformly in the polyamide-imide resin, and a solid lubricant held by the resin composition.

Here, the "organically modified layered clay mineral" is a layered clay mineral having an organic matter (organic cations) intercalated between layers. Generally, the layered clay mineral has a layered structure in which a number of sheets are laminated (the interlayer distance d=12 nm). In the organically modified layered clay mineral, on the contrary, the interlayer spacings are expanded by intercalating organic cations between the layers. Since such an organically modified layered clay mineral has a high compatibility with organic matters, the interlayer distance between the respective layers increases in the polyamide-imide resin and, in some cases, the respective layers are exfoliated and separated from one another in the polyamide-imide resin. As a result, the organically modified layered clay mineral can be dispersed uniformly in the polyamide-imide resin.

At this time, preferably the resin composition constituting the abovementioned sliding layer has an average linear expansion coefficient of $5\times10^{-5}$/° C. or less in the range from 100 to 200° C.

Moreover, a process for producing a slide member of the present invention, which is a process for producing the abovementioned slide member of the present invention, is characterized by comprising a coating composition coating step of coating at least a sliding surface side of a substrate with a coating composition comprising a mixture of a resin solution comprising a polyamide-imide resin and a solvent for dissolving the polyamide-imide resin, a solid lubricant, and an organically modified layered clay mineral, and a sliding layer forming step of forming a sliding layer by removing the solvent of the coating composition.

According to the slide member of the present invention and the process for producing a slide member of the present invention, the organically modified layered clay mineral is uniformly dispersed in the polyamide-imide resin. Since the layered clay mineral dispersed in the polyamide-imide resin is an inorganic matter, the abovementioned resin composition is superior in abrasion resistance. As a result, the abrasion resistance of the sliding layer is improved, and accordingly a slide member having superior sliding characteristics can be obtained.

Moreover, especially when the resin composition has an average linear expansion coefficient of $5\times10^{-5}$/° C. or less in the range from 100 to 200° C., even if sliding raises the temperature of the sliding layer, thermal expansion of the sliding layer is small. Therefore, the sliding layer can be prevented from being peeled off, which occurs when used under elevated temperatures.

Note that the sliding layer of the slide member of the present invention is a sliding layer formed on a substrate and formed by coating a substrate with a coating composition in which a resin solution comprising a polyamide-imide resin and a solvent is mixed with a solid lubricant and an organically modified layered clay mineral. Therefore, the sliding layer of the slide member of the present invention is different from a slide member produced by injection molding and does not require addition of a polyphenylene sulfide resin or a polyarylene sulfide resin to a polyamide-imide resin, as disclosed by Japanese Unexamined Patent Publication No. 2001-302,914. Besides, its production is easy despite of the use of a polyamide-imide resin having superior heat resistance.

BRIEF DESCRIPTION OF THE DRAWINGS

The present invention can be more deeply understood by reference to the following detailed description and the attached drawings. Hereinafter, the drawings will be briefly explained.

BEST MODE FOR CARRYING OUT THE INVENTION

Figure 1:
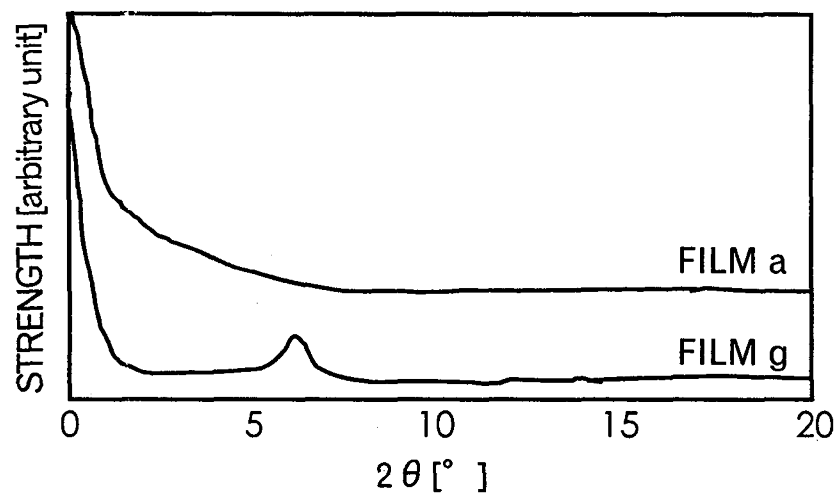
FIG. 1 shows X-ray diffraction results of a film specimen a comprising a PAI resin and an organically modified clay and a film specimen g used for production of slide members.

In order to describe the present invention in more detail, best mode for carrying out the slide member and the process for producing a slide member of the present invention will be described hereinafter.

[Slide Member]

The slide member of the present invention mainly has a substrate and a sliding layer.

With regard to the substrate, the shape and the like are not particularly limited as long as it is a sliding component part of a variety of devices, but preferably the substrate is formed of metal. For example, iron and steels, aluminum and aluminum alloys containing Mg, Cu, Zn, Si, Mn or the like, copper and copper alloys containing Zn, Al, Sn, Mn or the like are preferable. Moreover, particularly preferably, the substrate is a sliding component part of a compressor. Namely, the slide member of the present invention can be a slide member of a compressor. For example, the slide member of the present invention can be used as a swash plate of a swash plate type compressor. The slide member of the present invention can also be used as a shoe of a compressor. A swash plate and shoes of a swash plate type compressor sometimes slide against each other in a dry, unlubricated state. Even in sliding in such a very severe unlubricated condition, it is desirable to cause no seizure or abrasion. The use of the slide member of the present invention as a swash plate, a shoe or the like of a swash plate type compressor can fully satisfy conditions demanded for the swash plate type compressor.

In addition to the above, the slide member of the present invention can also be used as a bearing which supports a drive shaft of a compressor. The slide member of the present invention can also be used as a rotary valve which is integrally supported on a drive shaft of a piston type compressor and can open and close a gas passage between compression chambers and a suction pressure region because the drive shaft is rotatably supported by a housing of the piston type compressor and the rotary valve is rotated in synchronism with rotation of the drive shaft, and as a piston of the piston type compressor.

Moreover, the sliding layer is formed on at least a sliding surface side of the abovementioned substrate.

The sliding layer comprises a resin composition comprising a polyamide-imide resin and an organically modified layered clay mineral dispersed uniformly in the polyamide-imide resin, and a solid lubricant held by the resin composition. Namely, the resin composition plays the role of a binder which holds the solid lubricant.

Polyamide-imide resins applicable for the resin composition are not particularly limited, but can be formed by ordinary processes such as the diisocyanate method and the acid chloride method. Among these processes, the diisocyanate method is preferable in view of polymerizability and costs. Moreover, preferably the polyamide-imide resin has a number average molecular weight of not less than 10,000, more preferably not less than 12,000, and much more preferably not less than 14,000. When the number average molecular weight is less than 10,000, flexibility and heat resistance tend to be lowered. Besides, as the number average molecular weight of the polyamide-imide resin is greater, the sliding characteristics are improved more, but the number average molecular weight of not more than 35,000 is preferable in the present invention. When the number average molecular weight is greater than 35,000, viscosity of the finally resulting coating composition for a slide member becomes high and coating workability deteriorates.

As an organic solvent to be used for polymerization, it is preferable to use, a solvent having a relatively high dielectric constant singly or as a mixed, not only an amide solvent such as n-methyl-2-pyrrolidone, dimethylacetamide and dimethyformamide, a sulfur solvent such as dimethylsulfoxide and sulfolane, a nitro solvent such as nitromethane and nitroethane, an ether solvent such as diglyme and tetrahydrofuran, a ketone solvent such as cyclohexanone and methyl ethyl ketone, a nitrile solvent such as acetonitrile and propionitrile, but also γ-butyrolactone and tetramethylurea or the like. However, a solvent having a relatively low dielectric constant such as xylene and toluene can be used by mixing.

Generally, the reaction temperature is preferably from 50 to 200° C., and in order to promote reaction, the reaction can be carried out under the presence of tertiary amines, metals such as alkali metals, alkaline earth metals, cobalt, tin and zinc, metalloid compounds or the like.

In order to obtain the polyamide-imide resin of the present invention, trimellitic acid anhydride is used as an acid component monomer. In order to render solubility in a solvent and polymerizability, one or a mixture of two or more of the substances listed below can be copolymerized: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid and tridecanedioic acid; aromatic dicarboxylic acids such as isophthalic acid, 5-tert-butyl-1,3-benzenedicarboxylic acid, terephthalic acid, diphenylmethane-4,4'-dicarboxylic acid, diphenylmethane-2,4'-dicarboxylic acid, diphenylmethane-3,4'-dicarboxylic acid, diphenylmethane-3,3'-dicarboxylic acid, 1,2-diphenylethane-4,4'-dicarboxylic acid, 1,2-diphenylethane-2,4'-dicarboxylic acid, 1,2-diphenylethane-3,4'-dicarboxylic acid, 1,2-diphenylethane-3,3'-dicarboxylic acid, 2,2'-bis(4-carboxyphenyl)propane, 2-(2-carboxyphenyl)-2-(4-carboxyphenyl)propane, 2-(3-carboxy phenyl)-2-(4-carboxyphenyl)propane, diphenyl ether-4,4'-dicarboxylic acid, diphenyl ether-2,4-dicarboxylic acid, diphenyl ether-3,4-dicarboxylic acid, diphenyl ether-3,3'-dicarboxylic acid, diphenylsulfone-4,4'-dicarboxylic acid, diphenylsulfone-2,4-dicarboxylic acid, diphenylsulfone-3,4-dicarboxylic acid, diphenylsulfone-3,3'-dicarboxylic acid, benzophenone-4,4'-dicarboxylic acid, benzophenone-2,4-dicarboxylic acid, benzophenone-3,4-dicarboxylic acid, benzophenone-3,3'-dicarboxylic acid, pyridine-2,6-dicarboxylic acid, bis [(4-carboxy)phthalimide]4,4'-diphenylether and bis [(4-carboxy) phthalimide]α,α'-meta-xylene; butane-1,2,4-tricarboxylic acid, naphthalene-1,2,4-tricarboxylic acid and their anhydrides; butane-1,2,3,4-tetracarboxylic acid, pyromellitic acid, benzophenone-3,3',4,4'-tetracarboxylic acid, diphenylether-3,3',4,4'-tetracarboxylic acid, biphenyl-3,3',4,4'-tetracarboxylic acid, biphenyl-2,2',3,3'-tetracarboxylic acid, naphthalene-2,3,6,7-tetracarboxylic acid, naphthalene-1,2,4,5-tetracarboxylic acid, naphthalene-1,4,5,8-tetracarboxylic acid, and their dianhydrides; alkylene glycol-bis(anhydro-trimellitate) such as ethylene glycol-bis(anhydro-trimellitate), propylene glycol-bis(anhydro-trimellitate), polyethylene glycol-bis (anhydro-trimellitate) and polypropylene glycol-bis(anhydro-trimellitate.

On the other hand, as an amine component, one or a mixture of two or more of the substances listed below can be copolymerized: m-phenylenediamine, p-phenylenediamine, oxydianiline, methylenedianiline, hexafluoroisopropylidene dianiline, diamino-m-xylene, diamino-p-xylene, 1,4-naphthalenediamine, 1,5-naphthalenediamine, 2,6-naphthalenediamine, 2,7-naphthalenediamine, 2,2'-bis(4-aminophenyl) propane, 2,2'-bis(aminophenyl)hexafluoropropane, 4,4'-diaminodiphenylsulfone, 4,4'-diaminodiphenylether, 3,3'-diaminodiphenylsulfone, 3,4-diaminobiphenyl, 4,4'-diaminobenzophenone, hexamethylenediamine, tetramethylenediamine, isophoronediamine, 3,4-diaminodiphenylether, isopropylidenedianiline, 3,3'-diaminobenzophenone, dicyclohexyl-4,4'-diamine, 4,4'-diaminodiphenylmethane, o-tolidine, 2,4-tolylenediamine, 1,3-bis(3-aminophenoxy)benzene, 1,3-bis(4-aminophenoxy)benzene, 1,4-bis(4-aminophenoxy)benzene, 2,2-bis[4-(4-aminophenoxy) phenyl]propane, 2,2-bis[4-(4-aminophenoxy)phenyl] sulfone, 4,4'-bis(4-aminophenoxy)biphenyl, 2,2-bis[4-(4-aminophenoxy) phenyl]hexafluoropropane, 4,4'-diaminodiphenyl sulfide, 3,3'-diaminodiphenyl sulfide and their diisocyanates. Among these isocyanate components and amine components, diphenylmethane diisocyanate is the most preferable in view of reactivity, abrasion resistance, solubility, prices and the like.

The organically modified layered clay mineral dispersed in the abovementioned polyamide-imide resin is not particularly limited, but preferably it is a layered clay mineral organically modified by organic onium ions.

Here, the layered clay mineral is what is called a layered phyllosilicate. Examples of the layered phyllosilicate include smectite layered clay minerals such as montmorillonite, saponite, hectorite, beidellite, stevensite and nontronite; vermiculite, halloysite, swelling mica, and kaolinite. These layered phyllosilicates can be natural or synthetic. Therefore, preferably the organically modified layered clay mineral is sodium montmorillonite or sodium mica each organically modified by organic onium ions. Since sodium montmorillonite is widely distributed in nature and sodium mica is stably supplied as synthetics and easily available, sodium montmorillonite and sodium mica are preferable as raw materials of the organically modified layered clay mineral.

Preferably, the number of carbons in organic onium ions is 6 or more and, for example, alkyl onium ions are typically applied. When the number of carbons is less than 6, it is difficult for a polyamide-imide resin to infiltrate (intercalate) between layers and there is a fear that the respective layers cannot be exfoliated and dispersed. Moreover, more preferably, the number of carbons in organic onium ions is 10 or more. When the number of carbons is 10 or more, the organic onium ions shield the hydrophilicity of the clay layers and accordingly compatibility with a polyamide-imide resin is enhanced. Moreover, organic onium ions containing a polar group such as a hydroxyl group are more preferable. This is because when the organic onium ions contain a polar group such as a hydroxyl group, an interaction with the amino group and the imido group of the polyamide-imide resin is enhanced and as a result, due to dispersion of clay layers and hydrogen bonds with the amino group or the imido group, mechanical characteristics and the like are improved.

As the onium ions, it is possible to employ primary to quaternary ammonium ions, such as hexylammonium ions, octylammonium ions, 2-ethylhexylammonium ions, dodecylammonium ions, dodecyltrimethylammonium ions, laurylammonium ions, octadecylammonium ions, dioctyldimethylammonium ions, trioctylammonium ions, dioctadecyldimethylammonium ions, trioctylammonium ions, dioctadecyldimethylammonium ions (also known as distearyldimethylammonium), trioctadecylammonium ions, benzildimethyloctadecylammonium ions, methyloctadecyl-bis-2-hydroxylammonium ions, and ammonium dodecanoic acid.

It is also possible to employ phosphenium ions. As the phosphenium ions, it is possible to employ, for example, tetraethylphosphenium ions, triethylbenzilphosphenium ions, tetra-n-butylphosphenium ions, tri-n-butylhexadecylphosphenium ions, tri-n-butylbenzilphosphenium ions and the like.

Preferably, the layered clay mineral has highly swollen interlayer spacings, because with interlayer spacings between the respective layers fully expanded or with the respective layers separated from one another the layered clay mineral is uniformly dispersed in the polyamide-imide resin to constitute a resin composition. Preferably, the layered clay mineral has a cation exchange capacity of 50 to 200 meq/10 g and more preferably 70 to 150 meq/100 g. When the cation exchange capacity falls in the above range, organic modification by ion exchange with organic onium ions is fully carried out and accordingly the organically modified layered clay mineral is well dispersed in the polyamide-imide resin.

Note that, when the cation exchange capacity exceeds 200 meq/100 g, the number of bonds between negative charge of clay layers and cations existing between the clay layers increases and accordingly the interlayer bonding strength of the layered clay mineral increases and it becomes difficult for organic onium ions to infiltrate into the interlayer spacings by ion exchange and as a result there is a possibility that swelling of the layered clay mineral is insufficient.

Preferably the resin composition is 10 to 70% by weight and more preferably 20 to 60% by weight when the entire sliding layer is taken as 100% by weight. Moreover, preferably the organically modified layered clay mineral is added in an amount of at least 1% by weight and more preferably at least 3 to 20% by weight when the entire resin composition is taken as 100% by weight. When the amount is less than 1% by weight, the characteristics may become insufficient, and when the amount is more than 20% by weight, dispersibility may deteriorate. When the organically modified layered clay mineral is added in the above range, a resultant resin composition attains a smaller thermal expansion coefficient and a greater Young's modulus than those of a polyamide-imide resin to which an organically modified layered clay mineral is not added.

The solid lubricant held by the resin composition can be any generally used solid lubricant, and exemplified by layered structures such as graphite and talc, soft metals and their compounds such as Pb, Ag, Cu and the like, and fluorine compounds such as polytetrafluoroethylene (PTFE), perfluoroalkoxyalkane (PFA), ethylene-tetrafluoroethylene copolymer (ETFE), perfluoroethylene-propene copolymer (FEP), polyvinylidene fluoride (PVDF), ethylene-chlorotrifluoroethylene copolymer (ECTFE), and the like. Preferably the solid lubricant contains at least one of a fluorine resin, molybdenum disulfide and graphite. Especially when the slide member of the present invention is used under no lubrication, it is preferable to use PTFE as a solid lubricant. Moreover, preferably the solid lubricant is dispersed in the resin composition in powder form. It is preferable to use powder having a primary particle size of 0.1 to 20 μm, and more preferable to use powder having a primary particle size of 0.1 to 10 μm.

Note that preferably the solid lubricant is held in an amount of 10 to 90% by weight, and more preferably in an amount of 20 to 70% by weight, when the entire sliding layer is taken as 100% by weight.

Furthermore, in the slide member of the present invention having the above constitution, preferably the average linear expansion coefficient of the resin composition constituting the sliding layer in the range from 100 to 200° C. is smaller than that of the polyamide-imide resin to which an organically modified layered clay mineral is not added, and $5\times10^{-5}$/° C. or less. When the thermal expansion coefficient of the resin composition falls in the above range, even when the slide member is used under elevated temperatures or sliding raises the temperature of the sliding layer, it is possible to prevent the sliding layer from being peeled off by thermal expansion of the sliding layer.

Moreover, preferably Young's modulus (tensile elastic modulus) of the resin composition is greater than that of the polyamide-imide resin as a simple substance, and 2500 MPa or more. When the Young's modulus of the resin composition is too small, abrasion resistance tends to decrease. Moreover, the sliding layer comprising a resin composition having a high Young's modulus is easily deformable upon application of impact, and this deformation can increase an area receiving the impact and decrease surface pressure.

Note that the slide member of the present invention is not limited to the above mode of carrying out the present invention, and that other constitutions can be added. For example, it is possible to use a substrate whose sliding surface side surface has been subjected to surface treatment, or a substrate having an intermediate layer, which is different from the sliding layer, on the surface. Moreover, the sliding layer can contain any or all additives of inorganic particles such as titanium oxide, barium sulfate, calcium carbonate, alumina, silicon oxide, iron oxide and chrome oxide, extreme pressure agents such as sulfur-containing metallic compounds exemplified by zinc sulfide (ZnS) and silver sulfide ($Ag_2S$), coloring agents such as dyes and pigments, surfactants, dispersants, antioxidants, flame retardants, antistatic agents, leveling agents, antifoaming agents, silane coupling agents, and cross-linking agents such as epoxy resins, phenol resins, melamine resins and polyfunctional isocyanates.

[Process for Producing Slide Member]

The process for producing a slide member of the present invention is a process for producing the abovementioned slide member and comprises a coating composition coating step and a sliding layer forming step.

The coating composition coating step is a step of coating at least a sliding surface side of a substrate with a coating composition. The coating composition comprises a mixture of a resin solution, a solid lubricant and an organically modified layered clay mineral. The resin solution is not particularly limited as long as it is a resin solution comprising a polyamide-imide resin and a solvent for dissolving the polyamide-imide resin. Desirably the resin solution is what is called a PAI resin varnish, which comprises the above polyamide-imide resin (PAI resin) and a solvent for dissolving this PAI resin. In this case, as the solvent it is possible to employ a polar solvent, such as n-methyl-2-pyrrolidone and xylene, which can dissolve the polyamide-imide resin to be used and the organically modified layered clay mineral to be added. These solvents can be used singly or as a mixed solvent.

In mixing the coating composition, it is possible to add the above organically modified layered clay mineral into the resin solution and mix them first and then add the abovementioned solid lubricant and mixed them again. It is also possible to add the solid lubricant and the organically modified layered clay mineral all together into the resin solution and mix them. In mixing the coating composition, mixing can be carried out by using an ordinary ball mill or mixer. By adding at least the organically modified layered clay mineral into the resin solution and mixing them, organically modified portions of the layered clay mineral blend into (become compatible with) the polyamide-imide resin, and accordingly the interlayer distances between the respective layers further increase and, in some cases, the respective layers are exfoliated and separated from one another, and uniformly dispersed in the resin solution. As a result, it is possible to obtain a sliding layer in which the organically modified layered clay mineral is uniformly dispersed in the polyamide-imide resin. Also, the solid lubricant is uniformly dispersed in the resin solution.

Moreover, the process for coating the substrate with the coating composition is not particularly limited. The coating composition may be coated on a target portion by an ordinary coating process such as coating, flow coating, spray coating, spin coating and roll coating.

Note that the sliding surface side of the substrate can be subjected to surface treatment such as plating, thermal spraying, anodizing, chemical conversion coating and surface roughening. Moreover, an intermediate layer can be formed between the substrate and the sliding layer.

The sliding layer forming step is a step of forming a sliding layer by removing the solvent of the abovementioned coating composition. The sliding layer can be obtained by drying (and burning, if necessary) the coating composition coated on the substrate and hardening it. In this case, as for the drying conditions and the like, the best conditions may be suitably selected in accordance with the kind of the solvent of the resin solution.

Hereinafter, examples of the slide member and the process for producing a slide member of the present invention will be described with comparative examples.

[Production of Organically Modified Clay (Organically Modified Layered Clay Mineral)]

Sodium montmorillonite (Kunipia F manufactured by Kunimine Industries Co., Ltd. (only No. 8 was an organically modified clay, Cloisite 30B manufactured by Southern Clay Products, Inc.)), and sodium mica (ME100 manufactured by Co-op Chemical Co., Ltd.) were prepared as layered clay minerals, and also organic cations shown in Table 1 were prepared as organic onium salts. They were stirred and mixed in water. Then, sodium ions of the layered clay minerals were ion exchanged with organic onium ions, so as to have a cation exchange capacity of 110 meq/100 g. Thereby producing organically modified clay Nos. 1 to 10. Note that No. 11 in Table 1 is sodium montmorillonite which was not organically modified.

TABLE 1

| ORGANICALLY MODIFIED CLAY | LAYERED CLAY MINERAL | ORGANIC CATION |
|---|---|---|
| No. 1 | sodium mica | dodecylammonium |
| No. 2 | sodium mica | dodecyltrimethylammonium |
| No. 3 | sodium mica | benzildimethyloctadecylammonium |
| No. 4 | sodium mica | octadecylammonium |
| No. 5 | sodium mica | octadecyltrimethylammonium |
| No. 6 | sodium montmorillonite | benzildimethyloctadecylammonium |
| No. 7 | sodium montmorillonite | ammonium dodecanoic acid |
| No. 8 | sodium montmorillonite | methyloctadecyl-bis-2-hydroxylammonium |
| No. 9 | sodium montmorillonite | distearyldimethylammonium |
| No. 10 | sodium montmorillonite | octadecylammonium |
| No. 11 | sodium montmorillonite (untreated) | |

[Production of Slide Members]

As a PAI resin varnish, HPC-5000 manufactured by Hitachi Chemical Co., Ltd. was used (PAI resin number average molecular weight: 19,000, solid concentration: 37 wt %, solvent: n-methyl-2-pyrrolidone and xylene). The organically modified clays were added to this PAI resin varnish and stirred for three minutes and then deaerated for 30 seconds by using a mixer (a planetary centrifugal super defoaming mixer, "Awatori-Rentaro" manufactured by Thinky Corporation), thereby obtaining mixtures. Solid lubricant powder was added to the obtained mixtures and mixed for 3 hours by using a ball mill, thereby obtaining coating compositions.

The coating compositions were respectively coated on sliding surfaces of disk-shaped substrates (diameter: 90 mm, thickness: 5 mm) formed of an aluminum alloy (A390), dried at 80° C. for 30 minutes and then burned at 200° C. for one hour, thereby obtaining slide members A to L having sliding layers with the composition (percentages after solvent removal) shown in Table 2. Moreover, a slide member X4 was produced in a similar way to the above, except that the sodium montmorillonite (No. 11) which was not organically modified was used.

Moreover, slide members M, N and X5 were obtained by similar procedures to the above, except that the number average molecular weight of the PAI resins used was changed to 12,000 or 8,000.

Note that, in Table 2, slide members X1 to X3 are comparative examples containing no organically modified clay and were produced in a similar way to the slide members A to L, except that coating compositions obtained by adding the solid lubricant powder into PAI resin varnishes and mixing them for three hours by using the ball mill was used. At this time, in the slide member X2, as a PAI resin varnish, HPC-4250 manufactured by Hitachi Chemical Co., Ltd. was used (PAI resin number average molecular weight: 18,000, solid concentration: 37 wt. %, solvent: n-methyl-2-pyrrolidone and xylene).

Moreover, the sliding layers formed on sliding surfaces of the slide members A to N, X1 to X5 had a film thickness of 15 μm.

TABLE 2

| SLIDE MEMBER | ORGANICALLY MODIFIED CLAY [wt %] | | PAI RESIN [wt %] NUMBER AVERAGE MOLECULAR WEIGHT | | SOLID LUBRICANT POWDER [wt. %] MOLYBDENUM DISULFIDE | GRAPHITE | PTFE | SEIZURE TIME [sec.] |
|---|---|---|---|---|---|---|---|---|
| A | No. 1 | 3 | 19000 | 37 | 30 | 20 | 10 | 170 |
| B | No. 2 | 3 | 19000 | 37 | 30 | 20 | 10 | 168 |
| C | No. 3 | 3 | 19000 | 37 | 30 | 20 | 10 | 182 |
| D | No. 4 | 3 | 19000 | 37 | 30 | 20 | 10 | 164 |
| E | No. 5 | 3 | 19000 | 37 | 30 | 20 | 10 | 186 |
| F | No. 6 | 3 | 19000 | 37 | 30 | 20 | 10 | 159 |
| G | No. 7 | 3 | 19000 | 37 | 30 | 20 | 10 | 190 |
| H | No. 8 | 3 | 19000 | 37 | 30 | 20 | 10 | 210 |
| I | No. 8 | 1 | 19000 | 39 | 30 | 20 | 10 | 191 |
| J | No. 9 | 3 | 19000 | 37 | 30 | 20 | 10 | 171 |
| K | No. 10 | 3 | 19000 | 37 | 30 | 20 | 10 | 198 |
| L | No. 10 | 1 | 19000 | 39 | 30 | 20 | 10 | 176 |
| M | No. 8 | 3 | 8000 | 37 | 30 | 20 | 10 | 107 |
| N | No. 8 | 3 | 12000 | 37 | 25 | 15 | 10 | 142 |
| X1 | — | 0 | 19000 | 40 | 30 | 20 | 10 | 123 |
| X2 | — | 0 | 18000 | 40 | 30 | 20 | 10 | 131 |
| X3 | — | 0 | 8000 | 40 | 30 | 20 | 10 | 90 |
| X4 | No. 11 | 3 | 19000 | 37 | 30 | 20 | 10 | 97 |
| X5 | No. 11 | 3 | 12000 | 37 | 25 | 15 | 10 | 71 |

[Production of Film Specimens]

The above PAI resin varnishes (the PAI resins were HPC-5000 (number average molecular weight: 19,000) or HPC-4250 (number average molecular weight: 18,000)) and the organically modified clays were prepared so as to have the composition after solvent removal shown in Table 3, and kneaded by the above-mentioned mixer in a similar manner to the above, thereby obtaining mixtures. The obtained mixtures were coated by a bar coater, dried at 80° C. for 30 minutes and then burned at 200° C. for one hour, thereby obtaining film specimens a to g. It was visually confirmed that among them, the film specimens a to d were transparent and that the organically modified clays were uniformly dispersed in the PAI resins. It was confirmed that the film specimen g had bumps (aggregates) on the surface and that the untreated clay was not uniformly dispersed.

Note that the film specimens a to g were binder resins (resin compositions) which holds the solid lubricant powder of the sliding layer.

TABLE 3

| FILM | ORGANICALLY MODIFIED CLAY [wt. %] | | PAI RESIN [wt. %] | |
|---|---|---|---|---|
| a | No. 8 | 8 | HPC-5000 | 92 |
| b | No. 8 | 5 | HPC-5000 | 95 |
| c | No. 8 | 3 | HPC-5000 | 97 |
| d | No. 8 | 1 | HPC-5000 | 99 |
| e | — | 0 | HPC-5000 | 100 |
| f | — | 0 | HPC-4250 | 100 |
| g | No. 11 | 8 | HPC-5000 | 92 |

[Evaluation]

(X-ray Diffraction Measurement)

In order to confirm the dispersed states of the organically modified clays in the PAI resin, X-ray diffraction measurement was conducted for the film specimens a and g. The obtained diffraction chart is shown in FIG. 1. Note that the measurement was carried out by using RAD-B manufactured by Rigaku Electric Co., Ltd., with X-ray radiation: $CuK_{\alpha}$, tube voltage: 30 kV, tube current: 30 mA, slit width: DS: 0.17 mm, RS: 0.15 mm, SS: 0.17 mm, and in 2θ-θ scan mode.

As understood from FIG. 1, the film specimen g using the untreated layered clay mineral (No. 11) showed a diffraction pattern (2θ=6.7) attributable to the (001) surface of sodium montmorillonite. However, the film specimen a did not show a diffraction pattern attributable to the (001) surface. It is believed from this that the organically modified clay No. 8 had expanded interlayer spacings, no longer had a layered structure and was uniformly dispersed in the polyamide-imide resin.

(Viscoelasticity Measurement)

Figure 2:
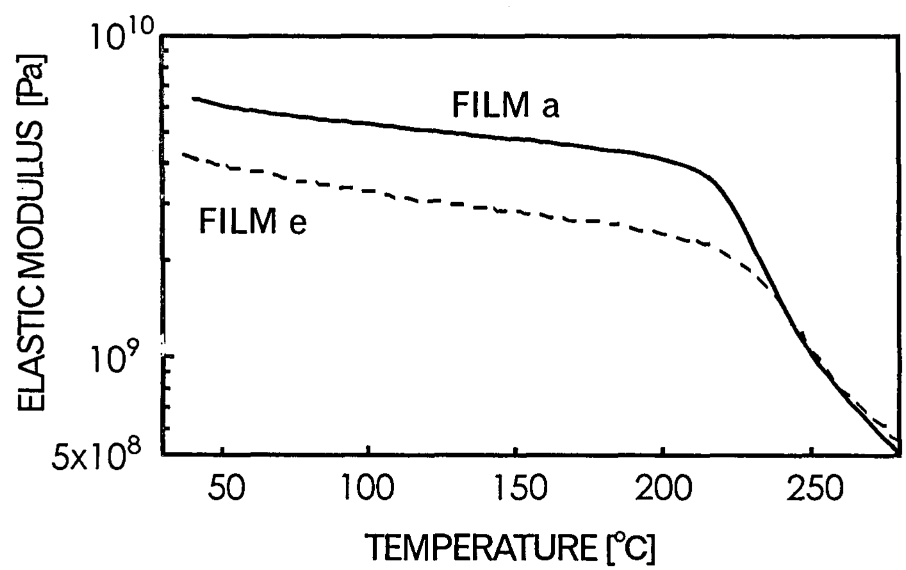
FIG. 2 is a graph showing viscoelasticity results of the film specimen a comprising the PAI resin and the organically modified clay and a film specimen e used for production of slide members.

In order to evaluate mechanical characteristics, viscoelasticity measurement was conducted for the film specimens a and e. The measurement results are shown in FIG. 2. Note that the measurement was carried out by using DMS manufactured by Seiko Instruments Inc. with chuck interval: 20 mm, measurement frequency: 1 Hz, tensile load: 50 mN and raising the temperature from room temperature (25° C.) to 280° C. at a rise rate of 3° C./min. The samples (film specimens) had a width of 4 mm and a thickness of 50 μm.

The difference between the film specimen a and the film specimen e was whether the organically modified clay was added or not. It is apparent from FIG. 2 that the addition of the organically modified clay to the PAI resin increased elastic modulus approximately by half in the range from room temperature to about 220° C.

[Evaluation of Slide Members]

In order to evaluate the slide members of the present invention, sliding characteristics of the slide members A to N, X1 to X5 were evaluated.

(Unlubricated Seizure Test)

Figure 3:
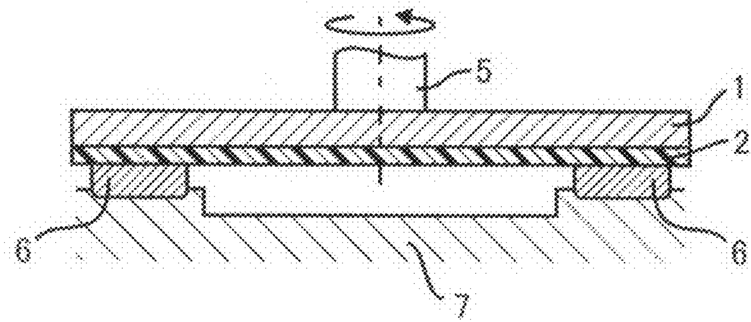
FIG. 3 is a schematic diagram illustrating test equipment used for evaluating sliding characteristics of slide members.
Figure 4:
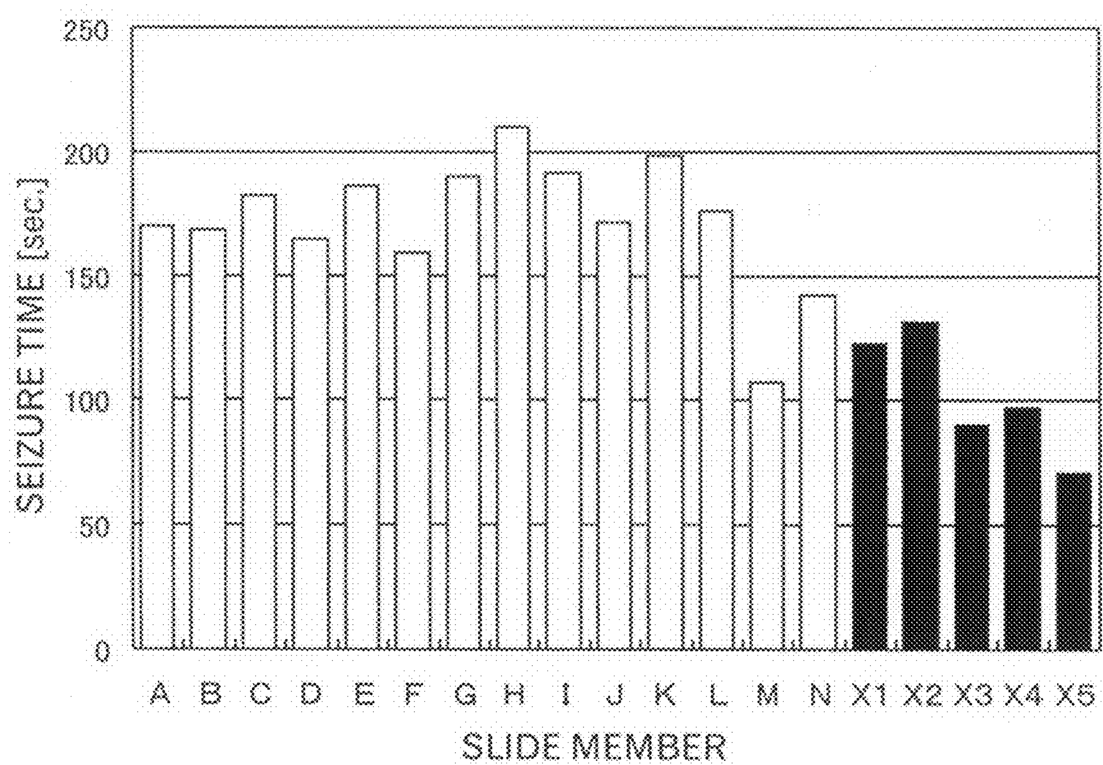
FIG. 4 is a graph showing unlubricated seizure test (abrasion resistance test) results of the slide members A to N and X1 to X5.

The respective slide members were subjected to an unlubricated seizure test (abrasion resistance test). Specifically, using test equipment shown in FIG. 3, each slide member fixed to a rotary shaft 5 from the side of a substrate 1 was rotated around the rotary shaft 5 on an upper surface of a shoe 6 formed of bearing steel (SUJ2) and fixed to a base portion 7. A sliding layer 2 was thus slidably contacted with the upper surface of the shoe 6. The sliding speed was set at 10 m/s and the load was set at 2,000 N, and the time from reaching a load of 2000 N to seizure occurrence was measured. The results are shown in Table 2 and FIG. 4.

In the case of the slide members A to L of the present examples having a PAI resin number average molecular weight of 19,000, no seizure occurred even when test time exceeded 150 seconds. Therefore, the sliding layers of the slide members A to L were superior in seizure resistance and the slide members A to L were superior in sliding characteristics to the slide members X1 and X2 to which organically modified clays were not added. Moreover, the sliding layers of the slide member M and the slide member X3 used the same amount of the solid lubricant powder but used a PAI resin having a low molecular weight of 8000. It is understood from the seizure test results of the slide member M and the slide member X3 that the addition of the organically modified clay improved seizure resistance.

Namely, owing to the addition of the organically modified clays, seizure resistance was improved regardless of the molecular weight of the resins used. This effect was more remarkable when the molecular weight of the resins was large (10,000 or more).

Moreover, as indicated by the slide members X4 and X5, addition of sodium montmorillonite (No. 11) which was not organically modified showed no effect of improving seizure resistance.

Note that PTFE, which had a particularly great effect on sliding characteristics, was used as the solid lubricant powder so as to be contained in the respective slide members at the same percentage (Table 2). Therefore, the respective slide members showed almost no difference in sliding characteristics caused by the contents of the solid lubricant powder.

(Oil-Lubricated Test)

Figure 5:
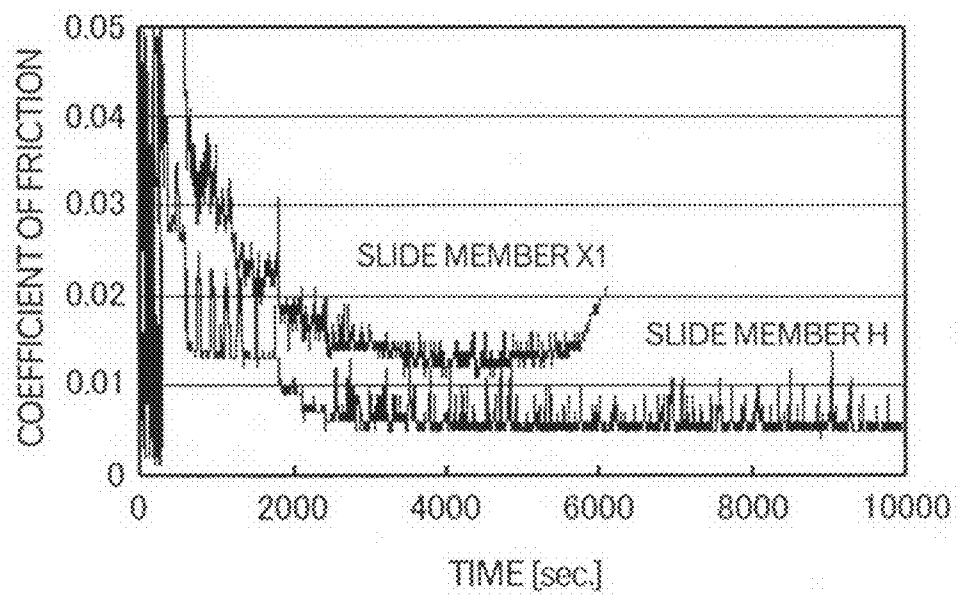
FIG. 5 is a graph showing oil-lubricated test results of the slide member X1 and the slide member H.

The slide member H and the slide member X1 were subjected to an oil-lubricated test. The test equipment shown in FIG. 3 was used and the sliding speed was set at 10 m/s and the load was set at 5,000 N (reaching this load in 3,000 seconds), and the coefficient of friction was measured under refrigerant oil lubrication. The measurement results are shown in FIG. 5. Note that after reaching a load of 5000 N, the slide member H had a coefficient of friction of 0.06 to 0.08 and the slide member X1 had a coefficient of friction of 0.13 to 0.15.

In the case of the slide member H of the present examples, no seizure occurred even when test time exceeded 10,000 seconds, but in the case of the slide member X1, seizure occurred when the test time exceeded 6,000 seconds. Moreover, the slide member H of the present examples had a smaller coefficient of friction than that of the slide member X1 and was superior in sliding characteristics.

[Evaluation of Binder Resin]

In order to evaluate binder resins constituting the sliding layers of the slide members of the present invention, mechanical characteristics of the film specimens a to f were evaluated.

(Tensile Test)

The film specimens a, c, e, f were subjected to a tensile test. The respective film specimens had a width of 4 mm and a thickness of 50 μm. The measurement was carried out with chuck interval: 20 mm and tensile speed: 10 mm/min. Note that the measurement temperature was room temperature (25° C.). The measurement results are shown in FIG. 6 (tensile strength), FIG. 7 (tensile elastic modulus), and Table 4.

Figure 6:
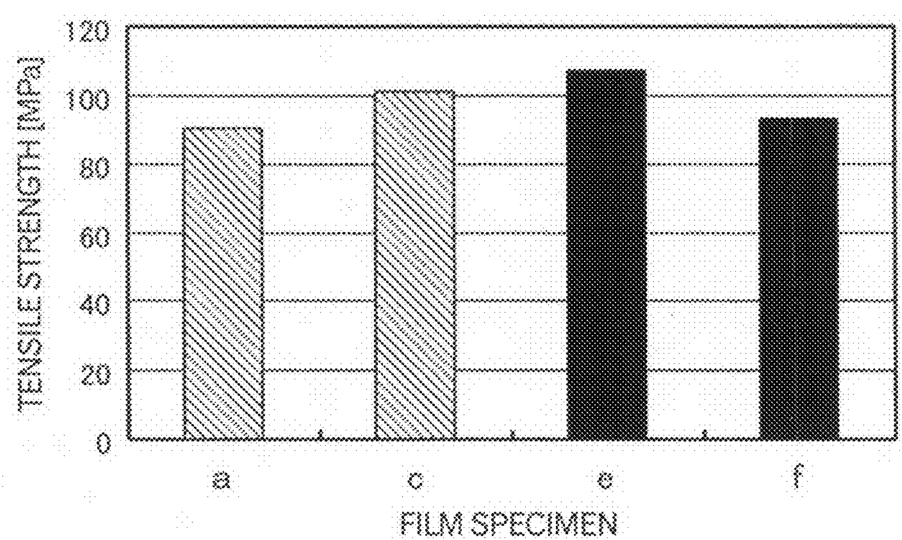
FIG. 6 is a graph showing tensile strength of binder resins of film specimens a and c, e and f.
Figure 7:
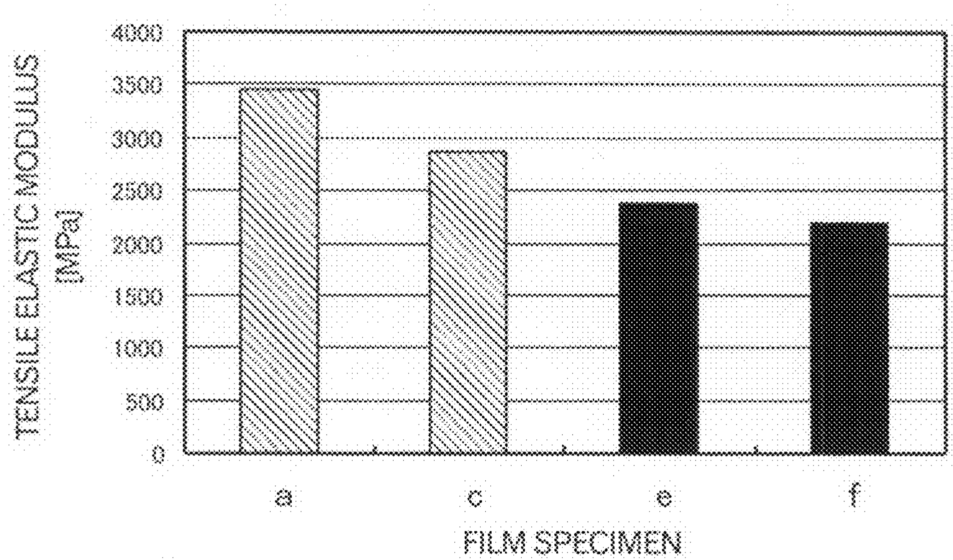
FIG. 7 is a graph showing tensile elastic modulus of the binder resins of the film specimens a and c, e and f.

As shown in FIG. 6, there were no big differences in tensile strength between the respective film specimens. As shown in FIG. 7, however, the amounts of the organically modified clays added and dispersed in the PAI resin caused a variation in the tensile elastic modulus (modulus of longitudinal elasticity). Owing to the dispersion of the organically modified clay in the PAI resin, tensile elastic modulus became not less than 2500 MPa (the film specimens a and c).

(Linear Expansion Coefficient Measurement)

Average linear expansion coefficient in the range from 100 to 200° C. was measured for the film specimens a to f. The respective film specimens had a width of 2 mm and a thickness of 50 μm. This measurement was carried out by using a thermomechanical analyzer (TMA) with chuck interval: 10 mm, tensile load: 100 mN, and temperature rise rate: 10° C./min. The measurement results are shown in FIG. 8 and Table 4.

Figure 8:
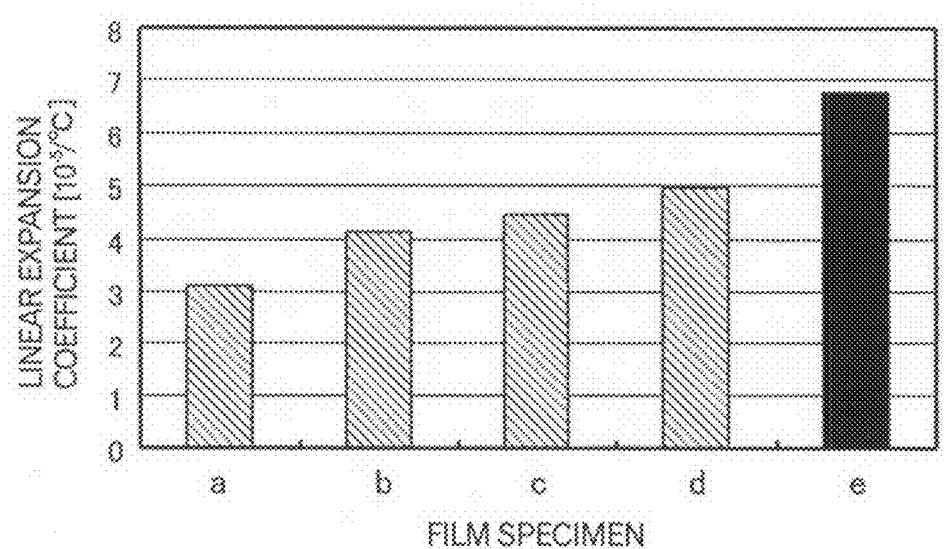
FIG. 8 is a graph showing the thermal expansion coefficient of the binder resins of the film specimens a to e.

In FIG. 8, the amount of the organically modified clay added decreased in the order of a, b, c, d, e on the axis of abscissas. (e had no addition.) Namely, owing to the addition of the organically modified clay, the average linear expansion coefficient became not more than $5\times10^{-5}$/° C., and as the amount of the organically modified clay dispersed in the PAI resin was greater, the thermal expansion coefficient was smaller.

TABLE 4

| FILM | TENSILE STRENGTH [MPa] | TENSILE ELASTIC MODULUS [MPa] | LINEAR EXPANSION COEFFICIENT [$10^{-5}$/° C.] |
|---|---|---|---|
| a | 90.19 | 3458 | 3.12 |
| b | — | — | 4.11 |
| c | 101 | 2866 | 4.45 |
| d | — | — | 4.95 |
| e | 106.9 | 2382 | 6.74 |
| f | 93.3 | 2190 | — |

(Coating Film Evaluation)

Coating film appearance was observed for film specimens I to VI. For preparation of the respective film specimens I to VI, first, the organically modified clay No. 8 was added into PAI resin varnishes containing PAI resins with different number average molecular weights and they were stirred for 3 minutes and then deaerated for 30 seconds by using the mixer (the planetary centrifugal super defoaming mixer, "Awatori-Rentaro" manufactured by Thinky Corporation), thereby obtaining mixtures. Solid lubricant powder was added to the obtained mixtures and mixed for 3 hours by using the ball mill, thereby obtaining coating compositions. The coating compositions comprise PAI resin: 13 wt. %, the organically modified clay: 1 wt. %, molybdenum sulfide: 10 wt. %, graphite: 7 wt. %, PTFE: 3 wt. %, and n-methyl-2-pyrrolidone: 57 wt. %. The obtained coating compositions were coated on PET films by the bar coater under an environment with a relative humidity of 40% and a temperature of 25° C., and thirty minutes later appearance of the coating films was observed. The results are shown in Table 5.

It is believed that when the number average molecular weight exceeds 36,000, the appearance gets worse and coating composition stability and coating workability deteriorate.

TABLE 5

| FILM | NUMBER AVERAGE MOLECULAR WEIGHT | APPEARANCE |
|---|---|---|
| I | 8000 | ○ |
| II | 12000 | ○ |
| III | 19000 | ○ |
| IV | 24000 | ○ |
| V | 31000 | ○ |
| VI | 36000 | X (gelling) |

The invention claimed is:

1. A slide member, which is characterized by having:

a substrate; and a sliding layer formed on at least a sliding surface side of said substrate and comprising a resin composition comprising a polyamide-imide resin having a number average molecular weight of 12,000 to 35,000 and an organically modified layered clay mineral dispersed uniformly in said polyamide-imide resin, and a solid lubricant held by said resin composition, wherein said resin composition has an average linear expansion coefficient of between $3.12\times10^{-5}$/° C. and $5\times10^{-5}$/° C. in the range from 100 to 200° C. and wherein said resin composition does not contain a polyphenylene sulfide resin or a polyarylene sulfide resin.

2. The slide member recited in claim 1, wherein said solid lubricant contains at least one of a fluorine resin, molybdenum disulfide and graphite.

3. The slide member recited in claim 1, wherein said solid lubricant contains at least polytetrafluoroethylene.

4. The slide member recited in claim 1, wherein said organically modified layered clay mineral is sodium montmorillonite or sodium mica each organically modified by organic onium ions.

5. The slide member recited in claim 4, wherein said organic onium ions contain a hydroxyl group.

6. The slide member recited in claim 1, wherein said substrate is a sliding component part of a compressor.

7. The slide member recited in claim 6, wherein said sliding component part is a swash plate of a swash plate type compressor.

8. The slide member recited in claim 6, wherein said sliding component part is a shoe of said compressor.

9. The slide member recited in claim 6, wherein said sliding component part is a drive shaft of said compressor or a bearing supporting said drive shaft of said compressor.

10. The slide member recited in claim 6, wherein said sliding component part is a piston of a piston type compressor.

11. A process for producing a slide member, which is characterized by comprising:

a coating composition coating step of coating at least a sliding surface side of a substrate with a coating composition comprising a mixture of a resin solution comprising a polyamide-imide resin having a number average molecular weight of 12,000 to 35,000 and a solvent for dissolving said polyamide-imide resin, a solid lubricant, and an organically modified layered clay mineral, wherein said resin composition does not contain a polyphenylene sulfide resin or a polyarylene sulfide resin; and a sliding layer forming step of forming a sliding layer by removing said solvent of said coating composition, wherein said sliding layer has an average linear expansion coefficient of between $3.12\times10^{-5}$/° C. and $5\times10^{-5}$/° C. in the range from 100 to 200° C.

12. The process for producing a slide member recited in claim 11, wherein said solid lubricant of said coating composition contains at least one of a fluorine resin, molybdenum disulfide and graphite.

13. The process for producing a slide member recited in claim 11, wherein said solid lubricant of said coating composition contains at least polytetrafluoroethylene.

14. The process for producing a slide member recited in claim 11, wherein said organically modified layered clay mineral of said coating composition is sodium mica or sodium montmorillonite each organically modified by organic onium ions.

15. The process for producing a slide member recited in claim 14, wherein said organic onium ions contain a hydroxyl group.

16. The process for producing a slide member recited in claim 11, wherein said solvent of said resin solution contains at least one of n-methyl-2-pyrrolidone and xylene.

* * * * *